W. BROECKER.
POTATO CARRIER FOR POTATO DIGGERS.
APPLICATION FILED FEB. 28, 1921.
1,425,745.
Patented Aug. 15, 1922.
2 SHEETS—SHEET 1.
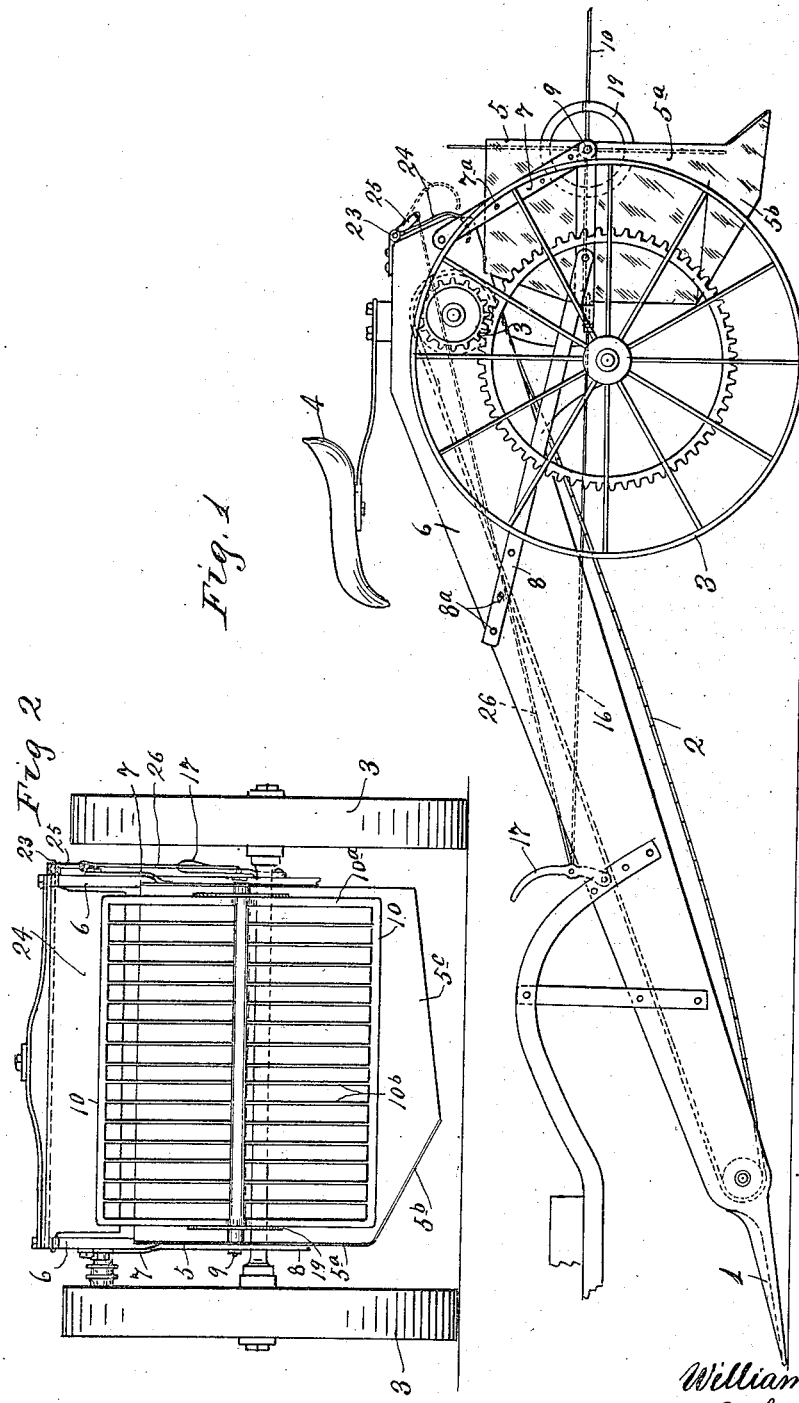
Inventor
William Broecker
By his Attorney
James F. Williamson

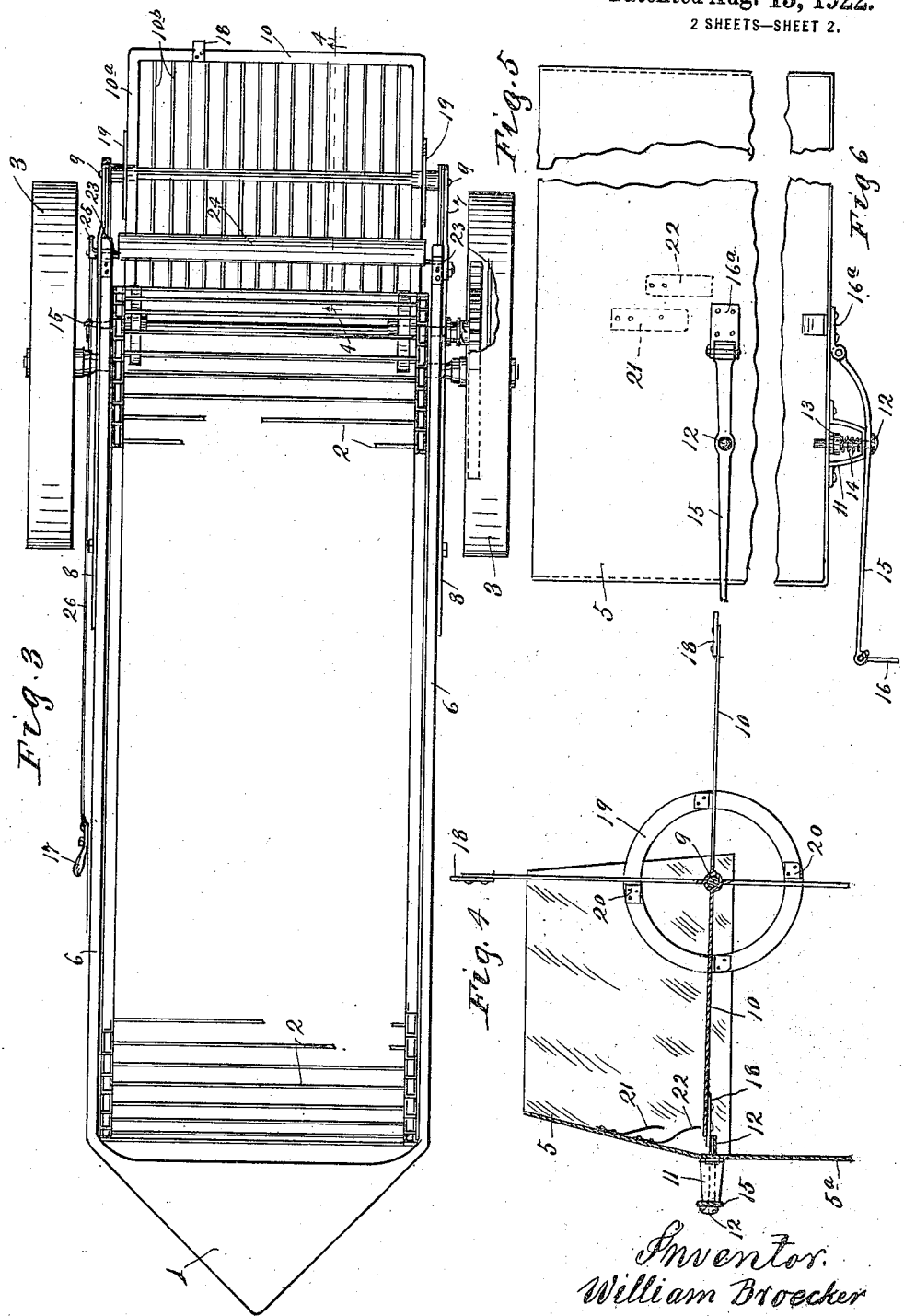

UNITED STATES PATENT OFFICE.

WILLIAM BROECKER, OF MINNEAPOLIS, MINNESOTA.

POTATO CARRIER FOR POTATO DIGGERS.

1,425,745.  Specification of Letters Patent.  Patented Aug. 15, 1922.

Application filed February 23, 1921. Serial No. 448,660.

*To all whom it may concern:*

Be it known that I, WILLIAM BROECKER, a citizen of the United States, residing at Minneapolis, in the county of Hennepin and State of Minnesota, have invented certain new and useful Improvements in Potato Carriers for Potato Diggers; and I do hereby declare the following to be a full, clear, and exact description of the invention, such as will enable others skilled in the art to which it appertains to make and use the same.

This invention relates to a carrying device and particularly to a carrying and discharging device adapted to be applied to a potato digger.

It is customary in potato diggers which are drawn by power other than hand power to have the potatoes carried up on an elevator and more or less separated from the dirt and then discharged on the ground in the rear of the digger. When this practice is followed, the dug and separated potatoes are placed along in rows, there being a row of such potatoes for each planted row. These potatoes have to be gathered by hand and this operation requires the gatherer to be always continuously bending over and picking up potatoes which are in a thin and more or less scattered row. This has proved such a fatiguing task that it has been exceedingly difficult for the potato growers to secure help for this harvesting operation.

It is an object of this invention therefore to provide a carrying attachment for the digger which will carry potatoes for quite a period and distance and can then be operated to discharge the same. By this means, potatoes will be discharged in wind-rows which are spaced a considerable distance apart and which rows will contain quite a large quantity of potatoes. The labor necessary to pick these up will thus be greatly lessened and the harvesting operation made much less arduous.

It is a further object of this invention to provide a carrier which can be readily applied to practically all modern types of power diggers and which can be conveniently and effectively operated by the operator of the digger.

These and other objects and advantages of the invention will become apparent from the following description made in connection with the accompanying drawings, in which like reference characters refer to the same parts throughout the different views, and, in which, Fig. 1 is a view in side elevation of a potato digger with the carrier applied thereto;

Fig. 2 is a view in end elevation of the digger and carrier as seen from the right side of Fig. 1;

Fig. 3 is a plan view of the digger and carrier;

Fig. 4 is a vertical section of the digger taken on the line 4—4 of Fig. 3;

Fig. 5 is a partial view in side elevation of the carrier shown on an enlarged scale; and Fig. 6 is a partial plan view of the front side of said carrier.

Referring to the drawings:

A power digger of an ordinary type is illustrated which comprises the digger share 1, the elevating and separating belt 2, the supporting wheels 3 and the gearing for driving the elevator together with the frame parts for supporting these various elements. An operator's seat is also shown as 4. The digger illustrated is meant to represent a standard type of such a machine and the present invention is not directed to the structure thereof, apart from the carrying device.

The carrying device comprises a hopper member 5, which at its upper portion is formed with three sides two of which extend approximately at right angles to the other, the hopper being open at the rear as clearly shown in Fig. 4. One side 5ᵃ of the hopper extends downwardly closely adjacent to the ground and is formed with a downwardly transversely extending portion 5ᵇ, which extends beneath and somewhat to one side of the upper portion of the hopper and is connected by downwardly extending triangular portion 5ᶜ which extends from the front portion of the hopper. This hopper is adapted to be carried by the side member 6 of the elevator member 2 and is attached thereto by a pair of bars 7, one of which is located at each side of the elevator and is provided with spaced holes 7ᵃ to facilitate the application of the hopper in the desired position. Other arms 8 are secured to the sides 5ᵃ of the hopper and are likewise bolted to the side 6 of the conveyor 2 as clearly shown in Figs. 2 and 3. The arms or bars 8 are likewise provided with a plurality of holes 8ª suitably spaced to afford an adjustment to properly locate the carrier. The ends of the bars 7 and 8 are, of course, pivoted to the sides 5ª of the hopper. A pivot 9 is supported in the sides of the hopper 5 and extends transversely across the same and a four-arm reel member 10 is journaled to rotate upon this shaft. This member 10 is clearly shown in Figs. 2 and 3 and comprises the four-frame members 10ª which are formed with the spaced rods 10ᵇ extending transversely thereacross, the frame members being arranged at an angle of ninety degrees to each other. A projecting bracket member 11 is provided with laterally extending flanges by which it is riveted or otherwise rigidly secured to the front of the hopper 5, and is apertured at its outer portion which is spaced from the side of the hopper to receive a bolt or rod member 12, which is provided inside of the bracket with a collar 13. The bolt member 12 extends into the hopper 5 through an aperture formed in the front side thereof and a spring 14 surrounds the same between the collar 13 and the bracket 11 which tends to hold the bolt with its end projecting into hopper. A lever 15 is pivoted in a bracket 16ª suitably and rigidly secured to the front side of the hopper and this lever extends along the front side of the bracket 11 and is provided with an aperture for receiving the bolt 12, the head of which is disposed on the outside of the lever, the lever extending from the bracket 11 to some distance beyond the sides of the hopper. This lever is connected at its outer end to a rod or cable member 16, which is pivoted at its other end to the intermediate portion of a pedal lever 17 which is pivoted at its lower end to the side 6 of the elevator frame. The upper portion of the lever 17 is formed as a pedal and is disposed in convenient position to be operated by the foot of a driver of the digger, occupying seat 4. The frame members 10ª of reel 10 have stop plates 18 bolted to their outer edges to extend outwardly therefrom and these plates are adapted to contact with the inner end of the bolt 12 in the particular frame member in contact with the bolt and the arm of the reel is thus supported in a horizontal position as shown in Fig. 4 and forms a grated bottom for the hopper 5. It may be here stated that the frame members 10ª are secured to annular rings 19 disposed at each end of the reel 10 by angle plates 20, which structure insures efficient and rigid support for said frames.

At the front of the hopper 5 on the inside of the wall thereof are riveted or otherwise rigidly secured a pair of leaf springs 21 and 22 having their lower and free ends projecting outwardly from the said wall in a position to be engaged by the outer sides of the frame 10ª for a purpose to be later described.

A small rod or shaft 23 is supported in suitable bearing brackets secured to the upper rear portion of the frame member 6 and extends transversely of the elevator 2. A member 24 is secured to this shaft and comprises a plate extending downwardly and having its inner end curved inwardly toward the upper end of the elevator belt 2. An arm 25 is rigidly secured to one end of the shaft and is connected at its outer end to a rod 26, the other end of which extends to the lever 17 and is pivoted thereto by the same pivot member which carries rod 16.

The operation of the device is as follows: The digger will be drawn along the potato row and the potatoes are unearthed and carried upon the elevator 2 in the usual manner. The potatoes will be discharged from the upper end of the elevator into the hopper 5 and will fall upon the grated frame 10ª, which will be in the position shown in Fig. 4. Any dirt which has not been previously separated from the potatoes can drop through the spaces in the frame 10ª. When a sufficient quantity of potatoes have been discharged into the hopper 5, the operator will press the pedal 17 and bolt 12 will then be withdrawn through the movement of lever 15 by rod 16. This will permit the potatoes to drop down and be discharged at the bottom of the hopper, the weight of the potatoes turning the reel 10. As the reel is turned down by the discharging potatoes, the next frame member 10ª will be brought into substantially horizontal position and will be moved far enough to have its outer bar moved under the end of spring 21 which will prevent reverse movement thereof. This spring is of rather light material and is designed to offer very little resistance to the movement of the frame. The frame will thus come in contact with the spring 22, which extends out somewhat farther than the spring 21 and is made much stiffer. The frame 10ª will rest against the spring until a certain quantity of potatoes have again been discharged into the hopper, when the weight thereof will move the frame down against the bolt 12 which has meanwhile been released by the operator removing his foot from the pedal 17, and has been moved to its inwardly portion by the spring 14. In order to prevent potatoes being discharged into the hopper while the frame members 10ª are not in position to receive and support the same, the member 24 is provided. It will be noted that when the operator presses pedal 17 to discharge the potatoes, he will also move the arm 25 and thus turn the shaft 23 to bring the curved end of member 24 into position to receive any potatoes which may be discharged by the elevator 2. When the pedal 17 is released, the member 24 will move substantially into position shown in dotted lines in Fig. 1 and when in this position will not interfere with the discharge of the potatoes into the hopper 5. The potatoes will preferably be dropped at points which will align transversely of the various rows so that the discharged potatoes will lie in continuous windrows.

From the above description it will be seen that applicant has provided a device which can be attached to a potato digger at small expense and which will greatly reduce the labor heretofore necessary in harvesting the potato crop.

The device is simple in construction and can be readily applied to the types of digger now in general use. The parts thereof are rugged, and the device will require substantially no attention to maintain the same in efficient operating condition.

It will, of course, be understood that various changes may be made in the form, details and arrangement of the device without departing from the scope of applicant's invention, which generally stated consists in the matter shown and described and set forth in the appended claims.

What is claimed is:—

1. In a power potato digger comprising an elevating means, a carrier for the potatoes comprising a hopper structure positioned to receive the potatoes from the elevating means, a revoluble grate bottom in said hopper and means adapted to be actuated by the operator for moving said bottom to discharge the potatoes from said hopper at suitable intervals.

2. In a power potato digger comprising an elevating means, a carrier device comprising a hopper structure arranged to receive potatoes discharged by the elevating means, a revoluble grate bottom for said hopper and means positioned for convenient actuation by the operator for moving said bottom to discharge the potatoes at regular intervals.

3. A carrier for a potato digger adapted to be supported on the digger in position to receive potatoes discharged thereby, comprising a hopper, a reel journaled for rotation on one side of said hopper comprising grate frames adapted to successively move into position to form a bottom for said hopper.

4. The structure set forth in claim three and a stop in said hopper for supporting said frames successively as they come into position to form the bottom of the hopper.

5. The structure set forth in claim three, a stop in said hopper for successively supporting said frames and means arranged for convenient actuation by the operator to withdraw said stop whereby the weight of the potatoes will move the reel and the potatoes will be discharged from said hopper.

6. The structure set forth in claim three and a stop in said hopper adapted to successively support said frames, means positioned for convenient actuation by the operator to withdraw said stop from the hopper and automatic means for moving said stop into the hopper.

7. In a potato digger having an elevating means and side frames enclosing the same, a carrier device adjustably supported on said side frames, comprising a hopper structure adapted to receive the potatoes discharged from said elevating means, a reel member journaled at one side of said hopper and comprising a plurality of angularly arranged grate frames adapted to successively come into substantially horizontal position across said hopper to form a bottom therefor, movable means for supporting said frames in said hopper, means adapted to be actuated by the operator for withdrawing said means, whereby the weight of the potatoes will turn the reel member, and means simultaneously actuated by the operator for preventing the discharge of potatoes into said hopper while the reel member is turning.

8. A carrier device for a potato digger adapted to be supported on the digger in position to receive the potatoes discharged thereby and comprising a hopper structure, angularly arranged perforated frames supported by and radiating from a common shaft rotatively mounted at one side of said hopper, means extending into said hopper for successively supporting said frames in horizontal position, means for preventing said frames from turning in reverse direction and means preventing severe impact of said frames on said supporting means.

9. A carrier for a potato digger comprising a hopper structure supported on said digger in position to receive potatoes discharged thereby, angularly arranged frames radiating from and rotating about a shaft located at one side of the hopper, means in said hopper for successively supporting said frames in substantially horizontal position, and a pair of leaf springs supported in said hopper positioned to contact with said frames when the same are rotated, one of said springs being of light structure and acting to prevent reverse rotation of said frames and the other spring being of heavy structure and adapted to momentarily support said frame until they are moved into position against the stop.

In testimony whereof I affix my signature.

WILLIAM BROECKER.